United States Patent
Polston

(10) Patent No.: US 10,390,523 B1
(45) Date of Patent: Aug. 27, 2019

(54) FISHING POLE HAVING INTEGRATED WEIGHING SYSTEM

(71) Applicant: Glen Polston, Apopka, FL (US)

(72) Inventor: Glen Polston, Apopka, FL (US)

( * ) Notice: Subject to any disclaimer, the term of this patent is extended or adjusted under 35 U.S.C. 154(b) by 205 days.

(21) Appl. No.: 15/413,503

(22) Filed: Jan. 24, 2017

(51) Int. Cl.
| | |
|---|---|
| *A01K 97/00* | (2006.01) |
| *A01K 97/12* | (2006.01) |
| *A01K 87/00* | (2006.01) |
| *G01G 19/60* | (2006.01) |
| *G01G 3/13* | (2006.01) |
| *G01G 3/14* | (2006.01) |

(52) U.S. Cl.
CPC ............ *A01K 87/007* (2013.01); *A01K 97/00* (2013.01); *A01K 97/125* (2013.01); *G01G 3/13* (2013.01); *G01G 3/14* (2013.01); *G01G 19/60* (2013.01)

(58) Field of Classification Search
CPC .... A01K 87/007; A01K 87/00; A01K 97/125; A01K 97/12; A01K 97/00; G01G 19/60; G01G 3/13; G01G 3/14; G01G 3/00; G01G 3/1416; G01G 3/12
USPC .................................. 43/4, 17; 73/760; 177/1
See application file for complete search history.

(56) References Cited

U.S. PATENT DOCUMENTS

| | | | | |
|---|---|---|---|---|
| 4,693,125 A | * | 9/1987 | Krutz | A01K 87/00 43/17 |
| 4,713,967 A | * | 12/1987 | Overs | A01K 91/08 374/136 |
| 5,121,804 A | | 6/1992 | Labs | |
| 5,259,252 A | * | 11/1993 | Kruse | A01K 87/00 177/148 |
| 5,962,817 A | | 10/1999 | Rodriguez | |
| 6,792,712 B1 | * | 9/2004 | Houg-Blymyer | A01K 97/06 24/16 PB |
| D559,347 S | | 1/2008 | Bell | |
| 7,408,125 B2 | | 8/2008 | Lentine | |
| 7,467,062 B2 | | 12/2008 | Stiner | |
| 7,861,454 B2 | * | 1/2011 | Pekin | A01K 89/00 43/17 |
| 8,272,273 B2 | * | 9/2012 | Chen | B82Y 30/00 73/760 |
| 8,474,331 B2 | * | 7/2013 | Pekin | A01K 77/00 73/862.471 |
| 2009/0084020 A1 | | 4/2009 | Sorey | |
| 2015/0068102 A1 | | 3/2015 | Britz | |
| 2016/0353725 A1 | * | 12/2016 | Worley, III | A01K 87/007 |
| 2016/0363476 A1 | * | 12/2016 | Van Komen | G01G 19/60 |

* cited by examiner

*Primary Examiner* — Darren W Ark
*Assistant Examiner* — Steven J Shur

(57) ABSTRACT

The fishing pole having integrated weighing system measures the weight of a fish caught by the fishing rod. The fishing pole having integrated weighing system comprises the fishing rod, a strain measurement device, and a control system. The strain measurement device measures the curvature of the fishing rod. The strain measured by the strain measurement device is converted by the control system into an estimated weight of the fish caught by the fishing rod. The fishing pole having integrated weighing system is configured to work with an externally provided remote monitor. The control system sends the strain measurement device data to the remote monitor. The fishing pole having integrated weighing system further comprises a cuff. The cuff is a shell that protects the strain measurement device while allowing for the unhindered motion of the fishing rod.

11 Claims, 6 Drawing Sheets

US 10,390,523 B1

FISHING POLE HAVING INTEGRATED WEIGHING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments for measurements and testing, more specifically, a weighing apparatus characterized by an elastically deformable member.

SUMMARY OF INVENTION

The fishing pole having integrated weighing system is a measurement device. The fishing pole having integrated weighing system is adapted for use with a fishing rod. The fishing pole having integrated weighing system is used to measure the weight of a fish caught on the fishing rod. The fishing pole having integrated weighing system comprises the fishing rod, a strain measurement device, and a control system. The force applied by the fish to the fishing rod results in a bend, or more specifically a curvature, of the fishing rod. The curvature of the fishing rod is related to the force applied to fishing rod. The strain measurement device measures the curvature of the fishing rod. The strain measured by the strain measurement device is converted by the control system into an estimated weight of the fish caught by the fishing rod. The fishing pole having integrated weighing system is further configured to work with an externally provided remote monitor. The remote monitor is in wireless communication with the control system. After processing the collected strain measurement device data, the control system sends the processed strain measurement device data to the remote monitor for display, analysis and archival purposes. The fishing pole having integrated weighing system further comprises a cuff. The cuff is a shell that protects the strain measurement device while allowing for the unhindered motion of the fishing rod.

These together with additional objects, features and advantages of the fishing pole having integrated weighing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the fishing pole having integrated weighing system in detail, it is to be understood that the fishing pole having integrated weighing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fishing pole having integrated weighing system.

It is therefore important that the claims be regarded as including such equivalent construction insofar as they do not depart from the spirit and scope of the fishing pole having integrated weighing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
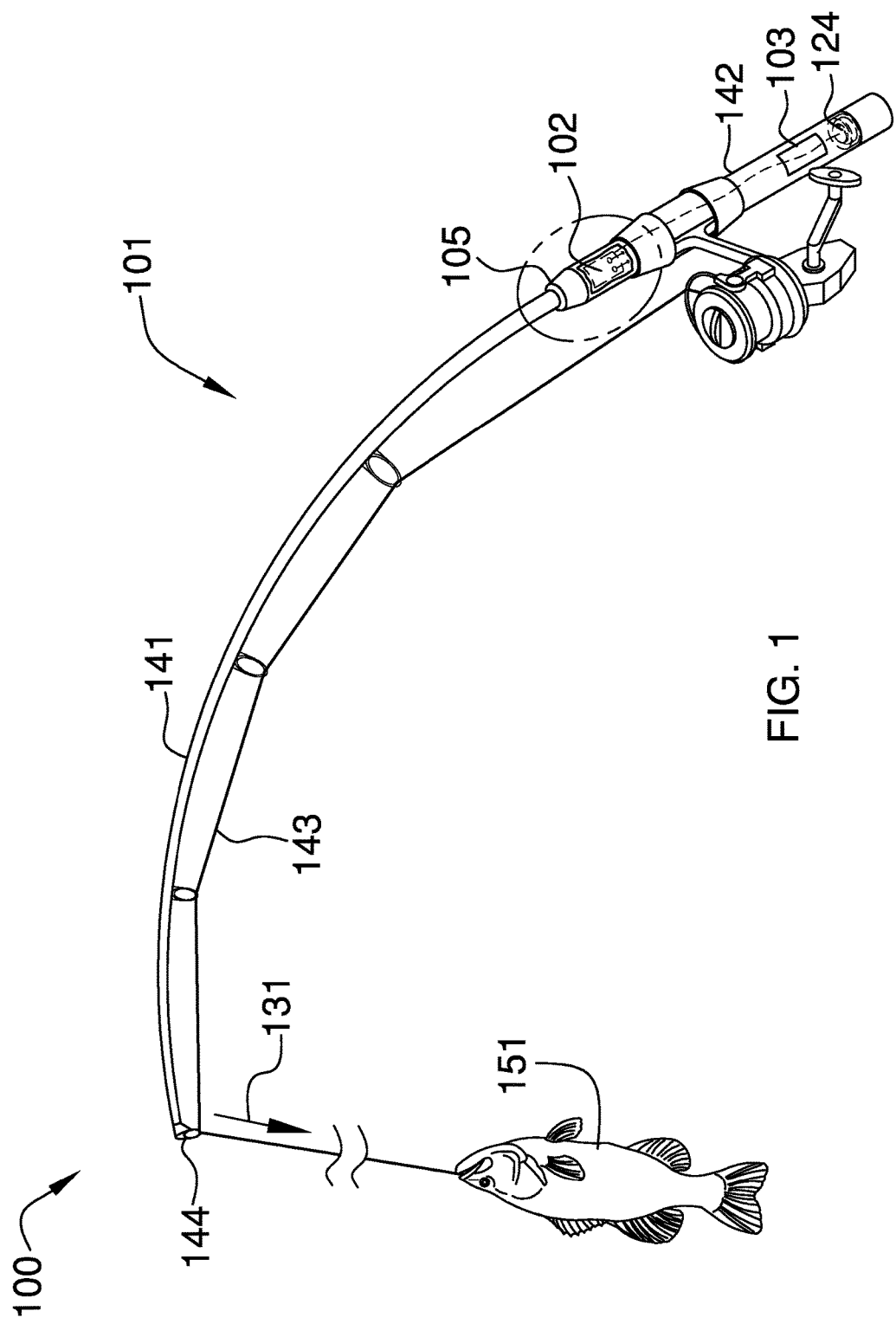
FIG. 1 is a perspective view of an embodiment of the disclosure.
Figure 2:
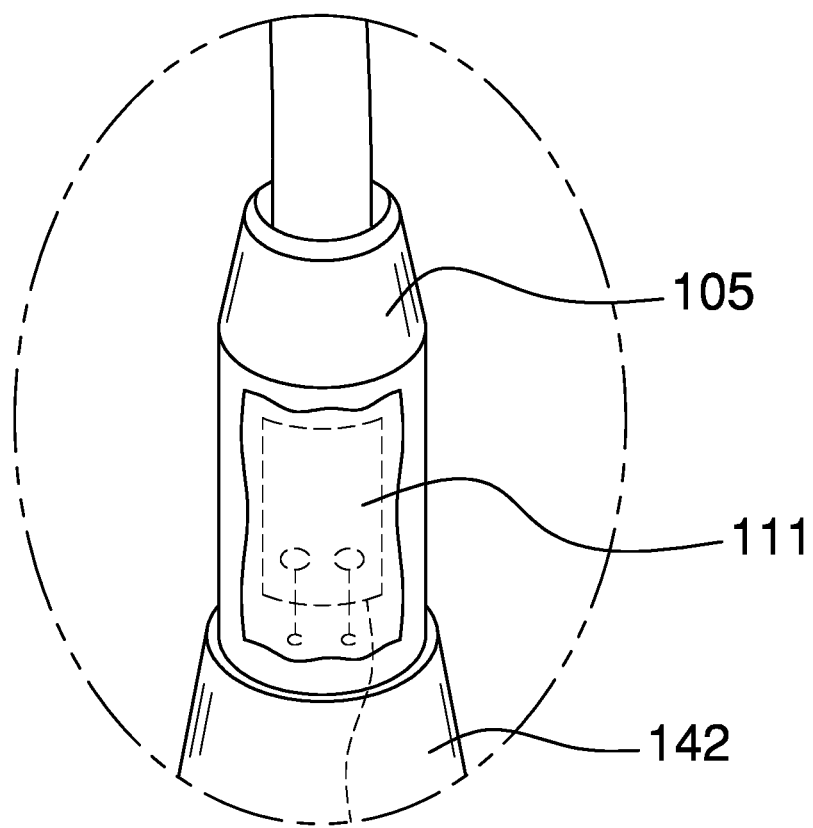
FIG. 2 is a detail view of an embodiment of the disclosure.
Figure 3:
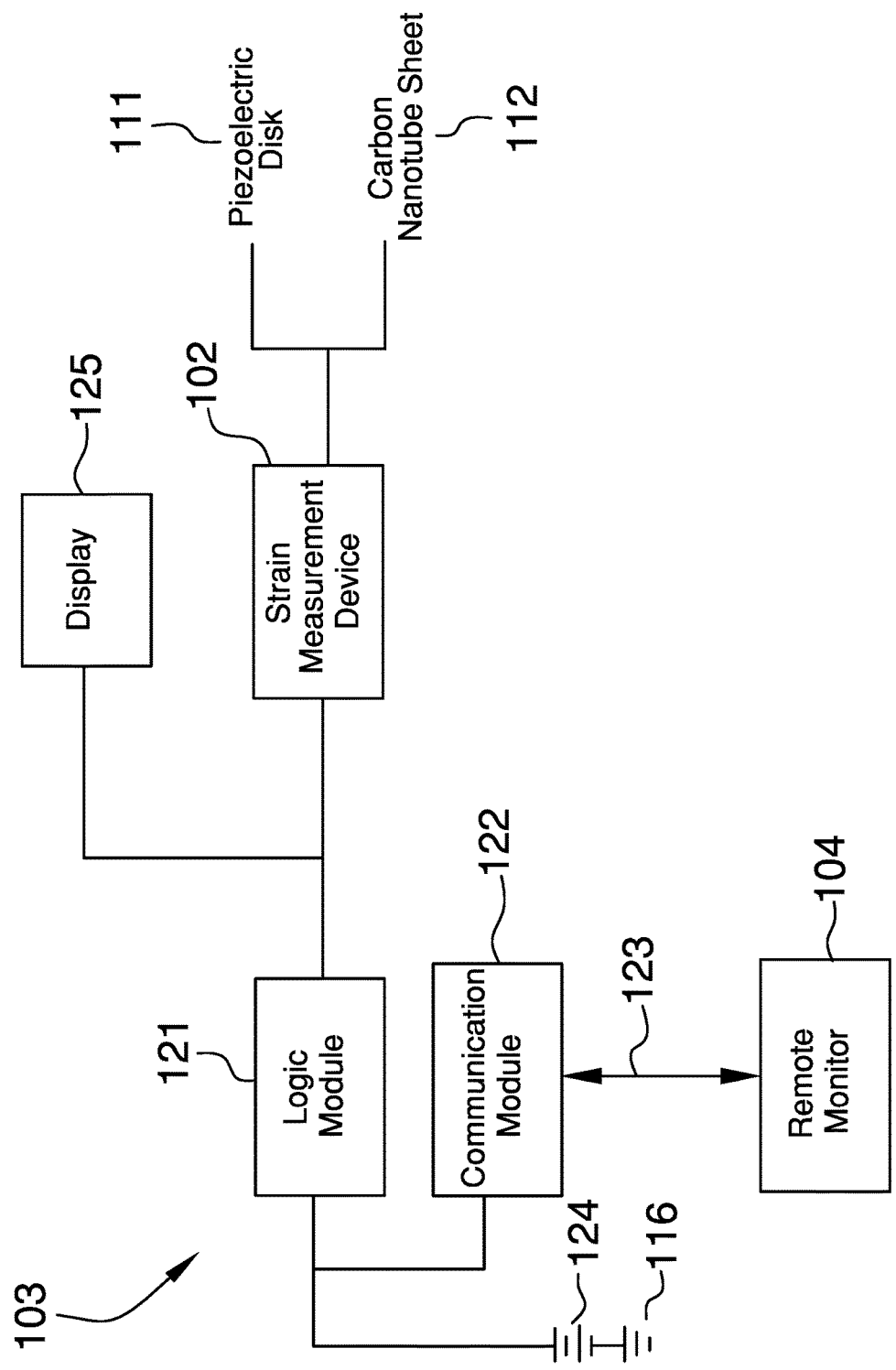
FIG. 3 is a block diagram or schematic view of an embodiment of the disclosure.
Figure 4:
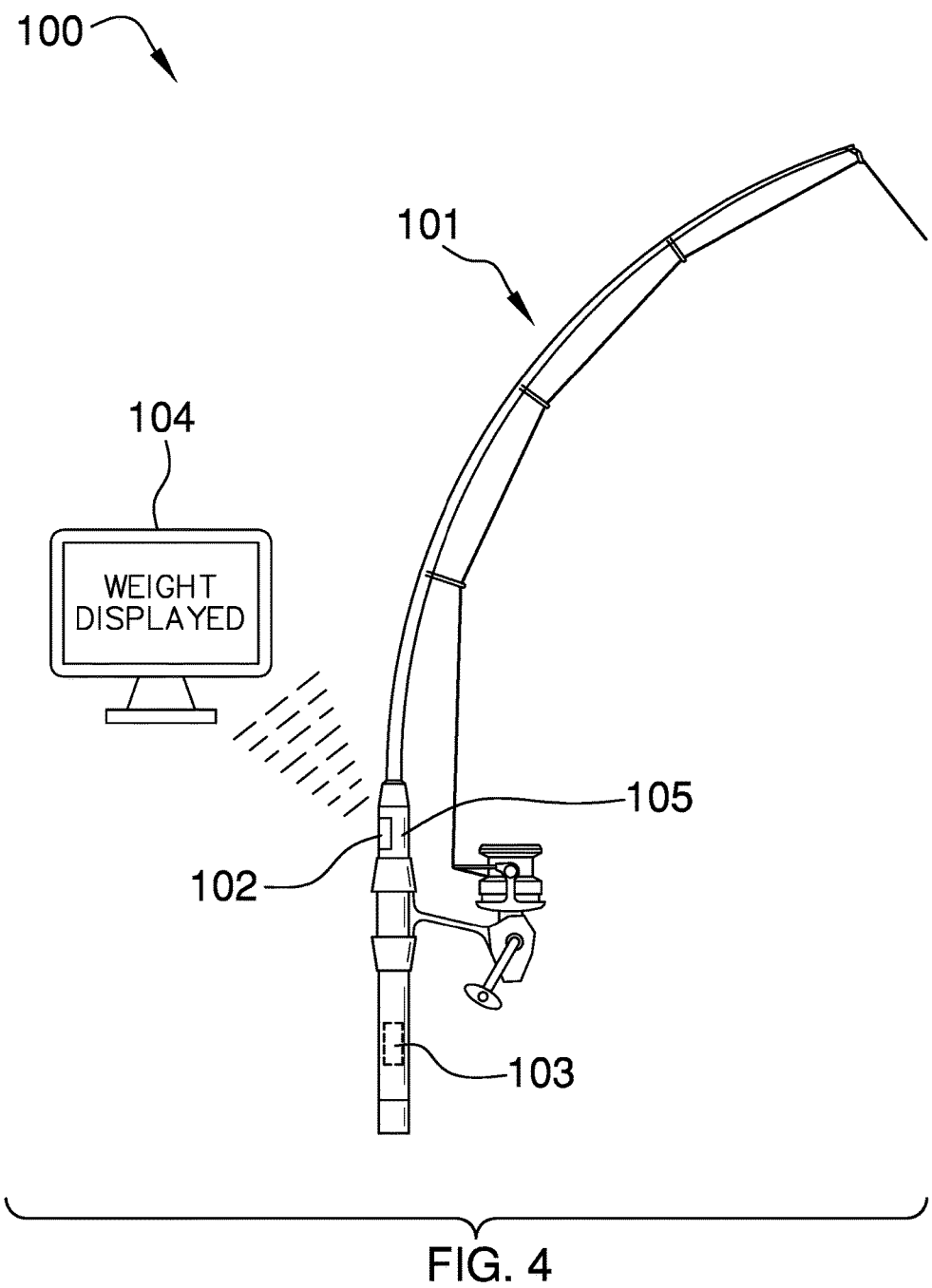
FIG. 4 is an in use view of an embodiment of the disclosure.
Figure 5:
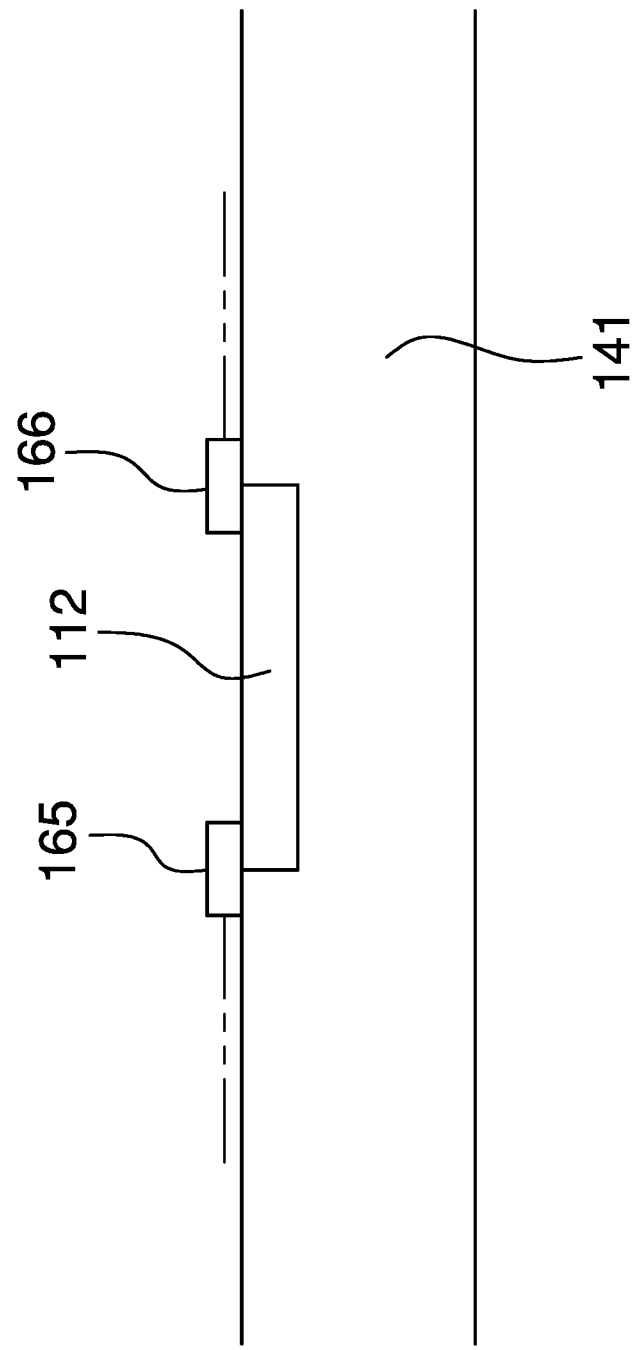
FIG. 5 is a detail view of an embodiment of the disclosure.
Figure 6:
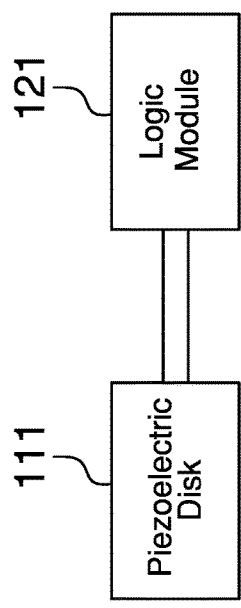
FIG. 6 is a block diagram of a detail of an embodiment of the disclosure.
Figure 7:
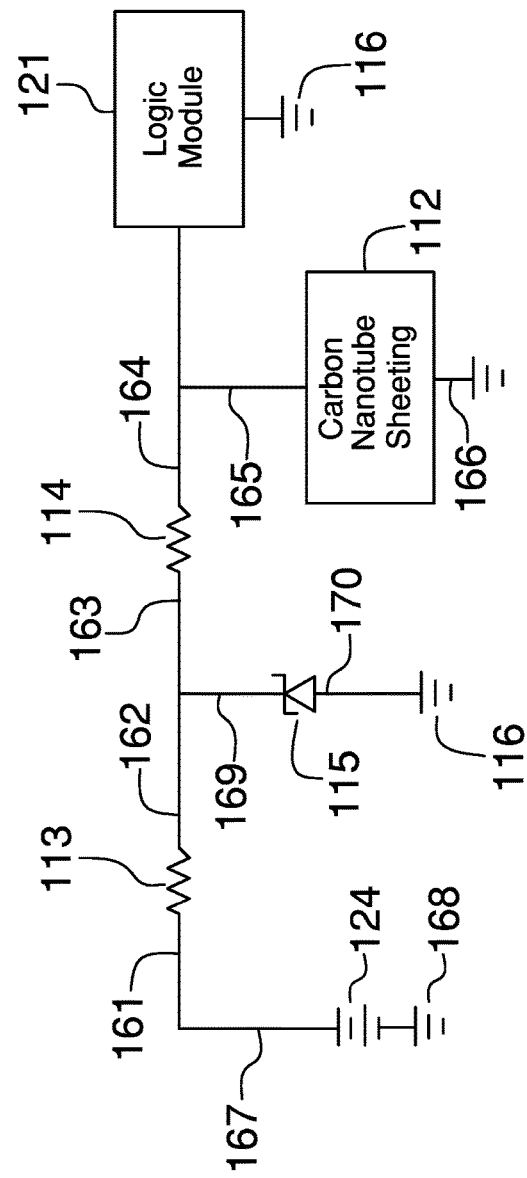
FIG. 7 is another block diagram of a detail of an embodiment of the disclosure.

Detailed reference will now be made to one or more potential embodiments of the disclosure, which are illustrated in FIGS. 1 through 7.

The fishing pole having integrated weighing system 100 (hereinafter invention) is a measurement device. The invention 100 is adapted for use with a fishing rod 101. The invention 100 is used to measure the weight of a fish 151 captured on the fishing rod 101. The invention 100 comprises the fishing rod 101, a strain measurement device 102, and a control system 103. The force 131 applied by the captured fish 151 to the fishing rod 101 results in a bend, or more specifically a curvature, of the fishing rod 101. The curvature of the fishing rod 101 is related to the force 131 applied to fishing rod 101. The strain measurement device 102 measures the curvature of the fishing rod 101. The strain measured by the strain measurement device 102 is converted by the control system 103 into an estimated weight of the fish 151 captured by the fishing rod 101. The invention 100 is further configured to work with an externally provided remote monitor 104. The remote monitor 104 is in wireless communication with the control system 103. After processing the collected strain measurement device 102 data, the control system 103 sends the processed strain measurement device 102 data to the remote monitor 104 for display, analysis and archival purposes. The invention 100 further comprises a cuff 105. The cuff 105 is a shell that protects the strain measurement device while allowing for the unhindered motion of the fishing rod 101.

The theory of operation of the invention 100 is described in this paragraph. The fishing rod 101 is further defined with a pole 141, a handle 142 a fishing line 143, and an end loop 144. The handle 142 is a cylindrical grip by which the fishing rod 101 is manipulated. The pole 141 is a cylindrical device that: 1) is attached to the handle 142 in the manner of a cantilever; and 2) is attached to handle 142 such that the center axis of the pole 141 is aligned with the center axis of the handle 142. The end loop 144 is a loop structure that is attached to the free end of the pole 141. The fishing line 143 is a monofilament cord that is attached at one end to the handle 142. The fishing line 143 is run along the pole 141 from the handle 142 through the end loop 144 to terminate at a point that is beyond the free end of the pole 141. When a fish 151 is captured on the fishing line 143, the retraction of the fishing line 143 to "reel" in the captured fish 151 places a load upon the fishing line 143. When this load is applied to the end loop 144, the load acts as an applied force 131 to the free end of the pole 141. This applied force 131 creates a curvature within the pole 141. One of the most studied and well understood problems within the field of strength of materials is the behavior of a cantilever that is subjected to a force applied to the free end of a cantilever. By knowing: 1) the composition and design parameters of the pole 141; and, 2) by measuring the displacement of the pole 141 at the fixed end (handle 142 end) of the pole 141, an estimate of the force 131 being applied to the free end of the pole 141 can be calculated. This force 131 estimate is correlated with the weight of the captured fish 151.

The fishing rod 101 is a well-known device that is used for capturing fish 151 from the water. The fishing rod 101 is further defined with a pole 141, a handle 142, a fishing line 143, and an end loop 144. The pole 141 is a shaft like device that is extends distance from the strain measurement device 102 to the end loop 144. The greater this distance, the more effective the strain measurement device 102 will be. The handle 142 is a hollow shaft that that acts as the grip of the fishing rod 101. The control system 103 is stored within the handle 142. The fishing line 143 is a monofilament cord. The end loop 144 is a loop that is formed on the free end of the pole 141 for the purpose of guiding the fishing line 143 to the free end of the pole 141.

The strain measurement device 102 is an electro-mechanical device that is used to measure displacement. The strain measurement device 102 is formed from an electrically active membrane. The electrical characteristics of the electrically active membrane will vary as a function of a deflection of the surface of the electrically active membrane. This variation of the electrical characteristics of the strain measurement device 102 caused by a deflection in the membrane are well known and documented in the electrical arts such that the curvature of the pole 141 under a force 131 may be calculated from this information.

In the first potential embodiment of the disclosure, the strain measurement device 102 comprises a piezoelectric disk 111. The piezoelectric disk 111 is a readily and commercially available piezoelectric disk 111. The piezoelectric disk 111 is mounted on the fixed end of the pole 141. The piezoelectric disk 111 uses the piezoelectric effect to generate a voltage that is related to the curvature of the pole 141. The logic module 121 will monitor this voltage and use the voltage to calculate an estimate of the curvature of the pole 141. The logic module 121 measures the voltage across the piezoelectric disk 111. The logic module 121 uses the voltage across the piezoelectric disk 111 to determine the curvature of the pole 141.

In the second potential embodiment of the disclosure, the strain measurement device 102 comprises a carbon nanotube sheet 112. The logic module 121 measures a voltage across the carbon nanotube sheet 112. The logic module 121 uses the voltage across the carbon nanotube sheet 112 to determine the curvature of the pole 141.

The carbon nanotube sheet 112 is a sheeting that has applied to it a coating of carbon nanotubes. The coating is applied within a magnetic field such that any first carbon nanotube in the applied coating is parallel to any second carbon nanotube in the applied coating. In this configuration, the carbon nanotube sheet 112 will act as an electric resistor when a voltage is applied across the carbon nanotube sheet 112. The resistance presented by the carbon nanotube sheet 112 to the applied electrical voltage is sensitive to the geometric configuration of the carbon nanotubes contained within the carbon nanotube sheet 112. As the carbon nanotube sheet 112 is deflected, the resistance of the carbon nanotube sheet 112 will change monotonically in a known or empirically discoverable manner such that: 1) the logic module 121 can detect the change in resistance as a change in voltage; and, 2) the logic module 121 can use this change in voltage to calculate the curvature of the pole 141.

The carbon nanotube sheet 112 is incorporated into an electric circuit that uses the carbon nanotube sheet 112 as one of the resistors in a two resistor voltage divider circuit. The operation and use of a voltage divider is well known and documented in the electrical arts. The voltage applied to the voltage divider is conditioned by a Zener diode 115, which minimizes the sensitivity of the voltage measured by the logic module 121 to potential voltage variations created by the battery 124. The carbon nanotube sheet 112 is incorporated into an electric circuit that further comprises a limit resistor 113, a divider resistor 114, a Zener diode 115, and an electrical ground 116.

The limit resistor 113 is a readily and commercially available resistor. The purpose of the limit resistor 113 is to limit current flow through the carbon nanotube sheet 112 and the Zener diode 115. The divider resistor 114 is a readily and commercially available resistor. The divider resistor 114 is placed in series with the carbon nanotube sheet 112 to form the voltage divider. The Zener diode 115 is a readily and commercially available Zener diode 115. The purpose of the Zener diode 115 is to present a constant voltage to the voltage divider. The electrical ground 116 is a common reference voltage that is used as an electrical connection point throughout the carbon nanotube sheet 112.

The limit resistor 113 is further defined with a first lead 161 and a second lead 162. The divider resistor 114 is further defined with a third lead 163 and a fourth lead 164. The carbon nanotube sheet 112 is further defined with a fifth lead 165 and a sixth lead 166. The battery 124 is further defined with a battery cathode 167 and a battery anode 168. The Zener diode 115 is further defined with a diode cathode 169 and a diode anode 170.

The battery cathode 167 electrically connects to the first lead 161 of the limit resistor 113. The second lead 162 of the limit resistor 113 electrically connects to the diode cathode 169 of the Zener diode 115. The second lead 162 of the limit resistor 113 electrically connects to the third lead 163 of the divider resistor 114. The fourth lead 164 of the divider resistor 114 electrically connects to the fifth lead 165 of the carbon nanotube sheet 112. The fourth lead 164 of the divider resistor 114 electrically connects to the logic module 121. The battery anode 168 electrically connects to the electrical ground 116. The diode anode 170 of the Zener diode 115 electrically connects to the electrical ground 116. The sixth lead 166 of the carbon nanotube sheet 112 electrically connects to the electrical ground 116.

The control system 103 is a device that measures and processes the variations in the electrical characteristics of the strain measurement device 102. In some potential embodiments of the disclosure, the control system 103 will communicate this data to a remote monitor 104. The control system 103 comprises a logic module 121, a communication module 122, and a battery 124.

The logic module 121 is a readily and commercially available programmable device that is used to manage, regulate, and operate the control system 103. The use of a logic module 121 is well known and documented in the electrical arts. The communication module 122 establishes a wireless communication link 123 between the logic module 121 and the remote monitor 104. The communication module 122 is a readily and commercially available wireless electronic communication device that allows the logic module 121 to establish a wireless communication link 123 with the remote monitor 104. The battery 124 is a readily and commercially available chemical device that converts chemical energy into electrical energy.

The wireless communication link 123 is a radio frequency connection that allows the logic module 121 and the communication module 122 to exchange data with the remote monitor 104.

In a third potential embodiment of the disclosure, the control system 103 further comprises a display 125. The display 125 is an electronic device that is connected to the logic module 121. The display 125 is a visual interface that displays the weight of a fish 151 while it is on the fishing line 143.

In a fourth potential embodiment of the invention 100, the invention 100 further comprises a remote monitor 104. The remote monitor 104 is an externally provided electronic device. The remote monitor 104 receives data from the control system 103. The remote monitor 104 displays, analyzes, and archives data received from the control system 103.

In a fifth potential embodiment of the disclosure, the invention 100 further comprises a cuff 105. The cuff 105 is a cylindrical structure that is placed around the control system 103 at the fixed end of the pole 141.

The following definitions were used in this disclosure:

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Cantilever: As used in this disclosure, a cantilever is a beam or other structure that projects away from an object and is supported on only one end.

Carbon Nanotube: As used in this disclosure, a carbon nanotube is a cylindrically-shaped material made of carbon having a diameter measuring on the nanometer scale. The carbon nanotube appears somewhat like a rolled-up chicken wire with a continuous unbroken hexagonal mesh and carbon molecules at the apexes of the hexagons. Carbon nanotubes have many structures, differing in length, thickness, and in the type of helicity and number of layers.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Cord: As used in this disclosure, a cord is a long, thin, and flexible piece of string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, and rope are synonyms for cord.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. In this disclosure, the term cylinder specifically means a right cylinder which is defined as a cylinder wherein the curved surface perpendicularly intersects with the two identical flat and parallel ends.

Electrical Ground: As used in this disclosure, an electrical ground is a common reference voltage that is used in the design and implementation of electrical circuits. An electrical ground is often, but not necessarily, the discharge point of electric currents flowing through an electric circuit.

Handle: As used in this disclosure, a handle is an object by which a tool, object, or door is held or manipulated with the hand.

Interface: As used in this disclosure, an interface is a physical or virtual boundary that separates two different systems across which information is exchanged.

LCD: As used in this disclosure, LCD is an acronym for Liquid Crystal Display. A liquid crystal display comprises a liquid crystal film placed between two sheets of transparent material. The visual characteristics of the can be varied through the application of a voltage.

Logic Module: As used in this disclosure, a logic module is an electrical device that is programmable and that accepts digital and analog inputs, processes the digital and analog inputs according to previously stored instruction and provides the results of these instructions as digital or analog outputs.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Monotonically: As used in this disclosure, monotonically is used to describe an unchanging direction of change. Specifically, monotonically describes variation that: 1) will always increases and never decrease; or, 2) will always increase and never decrease.

Piezoelectric Effect: As used in this disclosure, the piezoelectric effect refers to a class of materials wherein a strain placed upon the material will result in a redistribution of electrons within the material in a manner that causes an electric charge. This electric charge can be measured as a voltage drop across the material. A material commonly used to take advantage of the piezoelectric effect is polyvinylidene difluoride, which is also known as PVDF.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A measurement device comprising:
a fishing rod, a strain measurement device, and a control system;
wherein the strain measurement device and the control system are attached to the fishing rod;
wherein the fishing rod is used to capture a fish;
wherein the measurement device is used to measure a weight of said fish that is captured on the fishing rod;
wherein the fish applies a force to the fishing rod;
wherein the force applied by the fish to the fishing rod results in a curvature of the fishing rod;
wherein the curvature of the fishing rod is a function of the force applied to the fishing rod;
wherein the strain measurement device measures the curvature of the fishing rod;
wherein a strain measured by the strain measurement device is converted by the control system into an estimated weight of the fish captured by the fishing rod;
wherein the fishing rod is further defined with a pole, a handle, a fishing line, and an end loop;
wherein the end loop is a loop structure;
wherein the fishing line is attached to the handle;
wherein when the fish is captured on the fishing line;
wherein the pole is a cylindrical device that is attached to the handle in the manner of a cantilever such that the center axis of the pole is aligned with the center axis of the handle;
wherein the pole extends a distance from the strain measurement device to the end loop;
wherein the handle is a hollow shaft;
wherein the handle is a grip of the fishing rod;
wherein the control system is stored within the handle;
wherein the end loop is formed on a free end of the pole;
wherein the end loop guides the fishing line to the free end of the pole
wherein the strain measurement device is an electromechanical device that is used to measure displacement;
wherein the control system is a device that measures and processes a variation in an electrical characteristic of the strain measurement device;
wherein the control system comprises a logic module and a battery;
wherein the logic module is electrically connected to the strain measurement device;
wherein the battery is electrically connected to a communication module and the logic module;
wherein the strain measurement device is formed from an electrically active membrane;
wherein the electrical characteristic of the electrically active membrane will vary as a function of a deflection of a surface of the electrically active membrane;
wherein the curvature of the fishing rod under the force is calculated from the variation of the electrical characteristics of the strain measurement device caused by the deflection in the electrically active membrane;
wherein the logic module measures the voltage applied across a carbon nanotube sheet;
wherein the carbon nanotube sheet is incorporated into an electric circuit that uses the carbon nanotube sheet as one of two resistors in a two resistor voltage divider circuit;
wherein the carbon nanotube sheet is incorporated into the electric circuit that further comprises a limit resistor, a divider resistor, a Zener diode, and an electrical ground;
wherein the limit resistor limits current flow through the carbon nanotube sheet and the Zener diode;
wherein the divider resistor is placed in series with the carbon nanotube sheet to form a voltage divider;
wherein the Zener diode is a Zener diode that presents a constant voltage to the voltage divider;
wherein the electrical ground is a common reference voltage that is used as an electrical connection point throughout the carbon nanotube sheet;
wherein the limit resistor is further defined with a first lead and a second lead;
wherein the divider resistor is further defined with a third lead and a fourth lead;
wherein the carbon nanotube sheet is further defined with a fifth lead and a sixth lead;
wherein the battery is further defined with a battery cathode and a battery anode;

wherein the Zener diode is further defined with a diode cathode and a diode anode;

wherein the battery cathode electrically connects to the first lead of the limit resistor;

wherein the second lead of the limit resistor electrically connects to the diode cathode of the Zener diode;

wherein the second lead of the limit resistor electrically connects to the third lead of the divider resistor;

wherein the fourth lead of the divider resistor electrically connects to the fifth lead of the carbon nanotube sheet;

wherein the fourth lead of the divider resistor electrically connects to the logic module;

wherein the battery anode electrically connects to the electrical ground;

wherein the diode anode of the Zener diode electrically connects to the electrical ground;

wherein the sixth lead of the carbon nanotube sheet electrically connects to the electrical ground.

2. The measurement device according to claim 1
wherein the strain measurement device comprises a piezoelectric disk;
wherein the piezoelectric disk is mounted on a fixed end of the pole;
wherein the piezoelectric disk uses a piezoelectric effect to generate a voltage that is related to the curvature of the fishing rod.

3. The measurement device according to claim 2
wherein the control system further comprises a display;
wherein the display is an LCD (Liquid Crystal Display) that is connected to the logic module;
wherein the display is a visual interface that displays the weight of a fish while it is on the fishing line.

4. The measurement device according to claim 2
wherein the measurement device further comprises a remote monitor;
wherein the remote monitor is an externally provided electronic device;
wherein the remote monitor receives a data from the control system;
wherein the remote monitor displays, analyzes, and archives data received from the control system.

5. The measurement device according to claim 4
wherein the control system further comprises the communication module, and the battery;
wherein the communication module is electrically connected to the logic module;
wherein the communication module establishes a wireless communication link between the logic module and the remote monitor;
wherein the wireless communication link is a radio frequency connection that allows the logic module and the communication module to exchange data with the remote monitor.

6. The measurement device according to claim 5
wherein the control system further comprises a display;
wherein the display is an LCD that is connected to the logic module;
wherein the display is a visual interface that displays the weight of a fish while it is on the fishing line;
wherein the measurement device further comprises a cuff;

wherein the cuff is a cylindrical structure that is placed around the control system at the fixed end of the pole;
wherein the cuff is a shell that protects the strain measurement device while allowing for an unhindered motion of the fishing rod.

7. The measurement device according to claim 1
wherein the strain measurement device comprises a carbon nanotube sheet;
wherein the carbon nanotube sheet is a sheeting that has applied to it a coating of carbon nanotubes;
wherein the coating is applied to the carbon nanotube sheet such that any first carbon nanotube in the applied coating is parallel to any second carbon nanotube in the applied coating;
wherein the carbon nanotube sheet behaves as an electric resistor when a voltage is applied across the carbon nanotube sheet;
wherein a resistance presented by the carbon nanotube sheet to the applied electrical voltage is sensitive to a deflection of the carbon nanotube sheet.

8. The measurement device according to claim 1
wherein the control system further comprises a display;
wherein the display is an LCD that is connected to the logic module;
wherein the display is a visual interface that displays the weight of a fish while it is on the fishing line.

9. The measurement device according to claim 8
wherein the control system further comprises the communication module, and the battery;
wherein the communication module is electrically connected to the logic module;
wherein the communication module establishes a wireless communication link between the logic module and a remote monitor;
wherein the wireless communication link is a radio frequency connection that allows the logic module and the communication module to exchange data with the remote monitor.

10. The measurement device according to claim 1
wherein the measurement device further comprises a remote monitor;
wherein the remote monitor is an externally provided electronic device;
wherein the remote monitor receives data from the control system;
wherein the remote monitor displays, analyzes, and archives data received from the control system.

11. The measurement device according to claim 10
wherein the control system further comprises a display;
wherein the display is an LCD that is connected to the logic module;
wherein the display is a visual interface that displays the weight of a fish while it is on the fishing line;
wherein the measurement device further comprises a cuff;
wherein the cuff is a cylindrical structure that is placed around the control system at the fixed end of the pole;
wherein the cuff is a shell that protects the strain measurement device while allowing for the unhindered motion of the fishing rod.

* * * * *